(12) United States Patent
Stouffer et al.

(10) Patent No.: US 7,163,121 B1
(45) Date of Patent: Jan. 16, 2007

(54) HIGH TEMPERATURE ISOSTATIC PRESSURE BONDING OF HOLLOW BERYLLIUM PRESSURE VESSELS USING A BONDING FLANGE

(75) Inventors: Charles J. Stouffer, Kensington, MD (US); David C. Bugby, Vienna, VA (US)

(73) Assignee: Swales & Associates, Inc., Beltsville, MD (US)

( * ) Notice: Subject to any disclaimer, the term of this patent is extended or adjusted under 35 U.S.C. 154(b) by 0 days.

(21) Appl. No.: 09/434,507

(22) Filed: Nov. 5, 1999

Related U.S. Application Data

(60) Provisional application No. 60/143,916, filed on Jul. 14, 1999.

(51) Int. Cl.
   *B65D 6/28* (2006.01)
   *B65D 8/04* (2006.01)
   *B65D 8/06* (2006.01)
   *B23K 20/02* (2006.01)

(52) U.S. Cl. .................. 220/612; 220/678; 228/193

(58) Field of Classification Search ............... 220/612, 220/4.12, 678; 228/193, 160, 175, 184
   See application file for complete search history.

(56) References Cited

U.S. PATENT DOCUMENTS

| | | | |
|---|---|---|---|
| 2,082,985 A | * | 7/1937 | Mitchell .................. 220/612 X |
| 2,121,590 A | * | 6/1938 | Espe ...................... 220/612 X |
| 2,613,015 A | * | 10/1952 | Keating .................. 220/612 X |
| 2,941,064 A | * | 6/1960 | Gieser, Jr. et al. ...... 220/612 X |
| 3,082,521 A | | 3/1963 | Cohen ......................... 29/497 |
| 3,153,492 A | * | 10/1964 | Clair, Jr. .................. 220/612 X |

(Continued)

FOREIGN PATENT DOCUMENTS

EP    601 773    6/1994

(Continued)

OTHER PUBLICATIONS

McGraw-Hill Dictionary of Scientific and Technical Terms 570, 2161 (Sybil P. packer ed., McGraw-Hill 1994).*

(Continued)

*Primary Examiner*—Nathan J. Newhouse
*Assistant Examiner*—Harry Grosso
(74) *Attorney, Agent, or Firm*—Fish & Richardson P.C.

(57) ABSTRACT

A bond joint and process of bonding metal parts to one another to form seamless, hollow metal articles, particularly made from beryllium. Tooling is assembled to the parts, prior to hot pressing, to cause pressure to be applied to flanges that extend peripherally from the parts. The parts, assembled together with the tooling, are then subjected to hot isostatic pressing of the flanges at a temperature of about 1700° F. to 1750° F., and at a pressure of about 2000 psi to 2500 psi, for around 3 hours. The tooling surrounding the metal parts functions to limit the amount of compression of the flanges. Articles formed by this process are particularly useful in space flight applications because they are formed of a homogeneous material. This means that the articles can operate under high pressure despite being subjected to temperature cycling. Strength of the bond joint is enhanced because no filler metal is used. The absence of a filler metal also eliminates any thermal stress problems as a result of differences in coefficients of thermal expansion.

25 Claims, 6 Drawing Sheets

U.S. PATENT DOCUMENTS

| | | | |
|---|---|---|---|
| 3,739,617 A | 6/1973 | Stejskal | 72/63 |
| 3,872,576 A | 3/1975 | Mott | 29/471.7 |
| 3,940,268 A | 2/1976 | Catlin | 75/208 R |
| 3,964,667 A * | 6/1976 | Anderson | 228/194 |
| 3,980,220 A * | 9/1976 | Wolfe et al. | 228/160 |
| 4,096,615 A | 6/1978 | Cross | 29/156.8 |
| 4,141,484 A | 2/1979 | Hamilton et al. | 228/265 |
| 4,152,816 A | 5/1979 | Ewing et al. | 29/156.8 |
| 4,155,157 A | 5/1979 | Gersbacher | 29/726 |
| 4,429,824 A | 2/1984 | Woodward | 228/157 |
| 4,492,669 A | 1/1985 | Gould | 419/5 |
| 4,575,327 A | 3/1986 | Borchert et al. | 425/78 |
| 4,581,300 A | 4/1986 | Hoppin, III et al. | 428/546 |
| 4,724,975 A * | 2/1988 | Leventry | 220/4.12 X |
| 4,988,037 A | 1/1991 | Cadwell | 228/265 |
| 5,002,219 A | 3/1991 | Cadwell | 228/155 |
| 5,386,920 A | 2/1995 | Romano et al. | 220/2.2 |
| 5,593,085 A | 1/1997 | Tohill et al. | 228/193 |
| 5,615,826 A | 4/1997 | Dixon et al. | 228/208 |

FOREIGN PATENT DOCUMENTS

| | | |
|---|---|---|
| GB | 654.214 | 6/1951 |
| JP | 56-049463 | 5/1981 |
| JP | 57-28689 | 2/1982 |
| JP | 62-34687 | 2/1987 |

OTHER PUBLICATIONS

HTTP://www.mkicorp.com/About%20Us/Diffusion.htm?Applications/Chemical/Nutsche.htm.*

19 McGraw-Hill Encyclopedia of Science & Technology 436 (McGraw-Hill, 7$^{th}$ ed. 1992).*

Chemical Engineers' Handbook 23-38-39, 23-56 (Robert H. Peiry and Cecil H. Chilton eds., McGraw-Hill 5$^{th}$ 1973).*

16 Kirk-Othmer Encyclopedia of Chemical Technology 396 (John Wiley & Sons, 4$^{th}$ ed. 1995).*

* cited by examiner

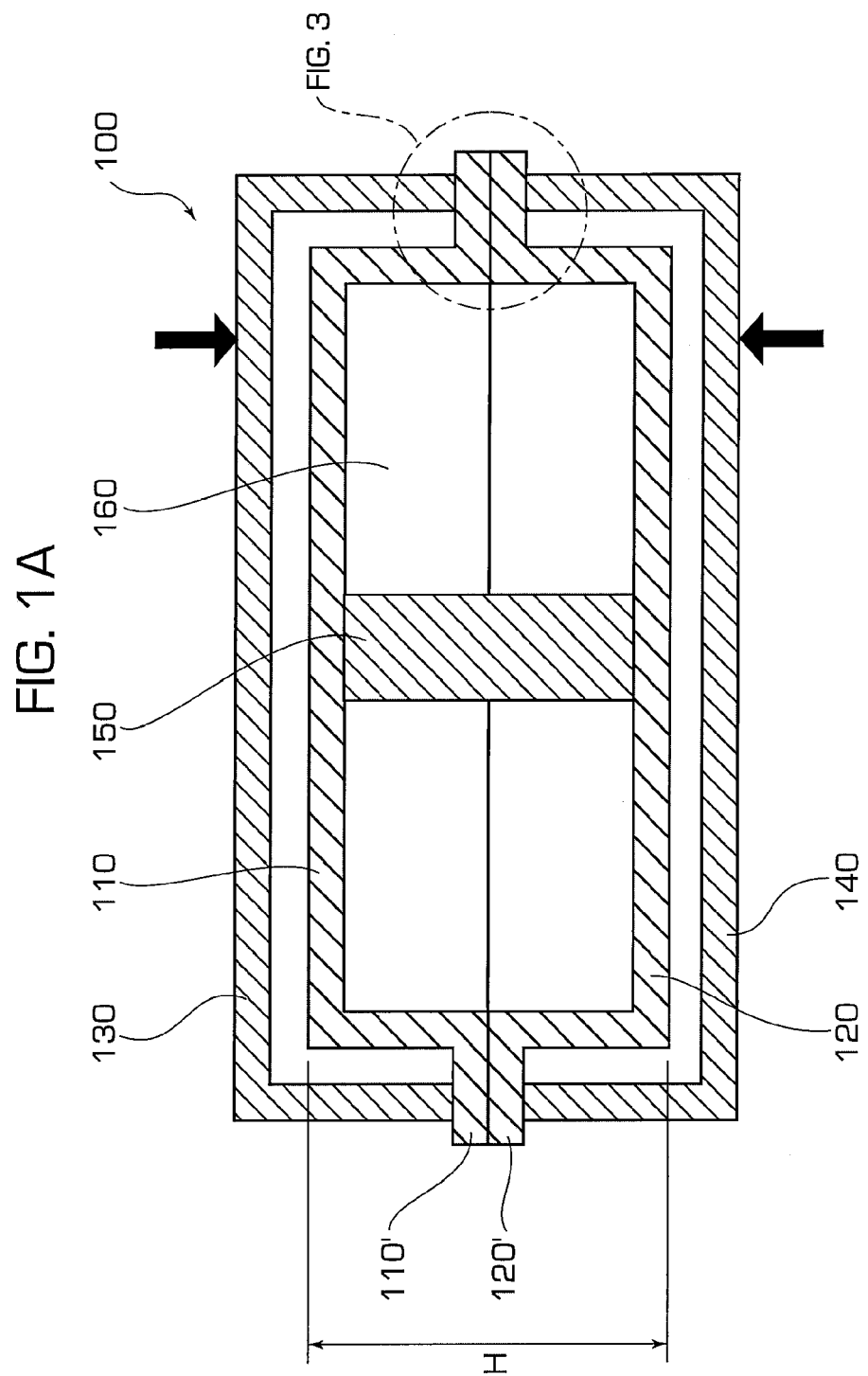

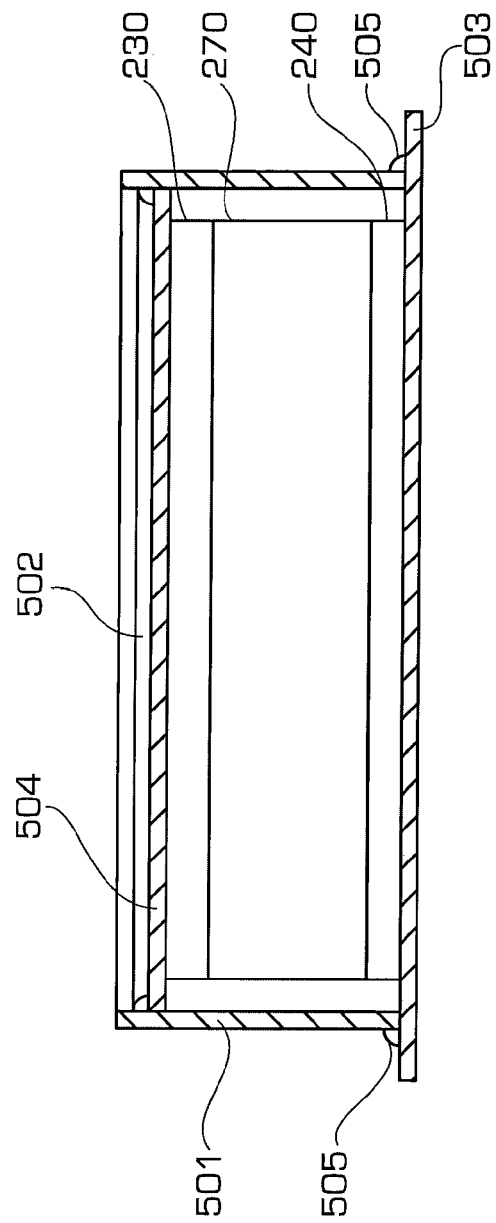

HIGH TEMPERATURE ISOSTATIC PRESSURE BONDING OF HOLLOW BERYLLIUM PRESSURE VESSELS USING A BONDING FLANGE

CROSS REFERENCE TO RELATED APPLICATIONS

The present application claims priority under 35 U.S.C. § 119(e) from provisional application No. 60/143,916, filed Jul. 14, 1999.

BACKGROUND OF THE INVENTION

1. Field of the Invention

The present invention relates generally to methods of bonding and sealing together metal parts. In particular, the present invention relates to processes of fabricating and repairing hollow beryllium structures, that must be leak tight and that experience temperature cycles, through high temperature isostatic pressure bonding.

2. Background Information

Typically beryllium vessels have been formed by welding or brazing using a filler metal, such as aluminum or silver. The problem with such vessels is that the coefficient of thermal expansion (CTE) of the filler metal is substantially different from that of the bulk beryllium. The use of a filler metal for joining results in low strength properties. Although these methods can be adequate under some circumstances for systems that require lower strength properties and do not go through temperature cycling, they will not guarantee leak tightness, particularly with large or complex beryllium containers.

Furthermore, these bonding methods should not be used with pressure vessels having high internal pressures and that are subjected to large temperature variations, $\Delta T$. One example of such a vessel is a space flight Cryogenic Thermal Storage Unit (TSU). Cryogenic TSUs experience a large temperature swing ($\Delta T \approx 300$ K), and require large factors of safety in the bond area to meet the aerospace requirements.

A need therefore exists for improved bonding methods that provide the necessary reliability.

SUMMARY OF THE INVENTION

It is therefore an object of the present invention to provide a means for building or repairing fabricated structures that have high strength joints.

It is therefore an object of the present invention to provide a means for building or repairing, without introducing a filler metal, hollow metal (e.g., beryllium) structures that meets high strength, temperature cycling applications, such as aerospace requirements.

It is therefore an object of the present invention to provide hollow metal (e.g., beryllium) pressure vessel structures that provide a bond joint homogeneous with the parent metal.

It is a further object of the present invention to provide a hot isostatic pressure (HIP) bond method of sealing outer shells regardless of size and configuration.

It is a further object of the present invention to provide a HIP bond method of sealing outer shells, with an external bond joint configuration.

It is proposed that the bonding method of the present invention can be used to seal pressure vessels, such as thermal storage devices for space flight applications, as well as other applications where reliability, low mass, and homogeneous properties to handle high strength with extreme temperature swings are important considerations. Typically these systems require weight optimization, high reliability and the ability to withstand large temperature cycling throughout their functional life. The HIP bond method of sealing a pair of outer shells is ideal for these applications, providing a vessel with a homogeneous material composition. An important aspect of the invention is to provide a reliable bond joint regardless of the size or configuration of the vessel being formed.

Some of the above objects are obtained by a method of bonding metal shells to form a vessel having an interior void. The method involves forming each of the metal shells with a peripheral flange and then aligning the metal shells with one another such that their respective peripheral flanges are engaged with one another. The aligned metal shells are assembled together with tooling to engage the flanges. Compression force is then applied to the flanges, via the tooling, at an elevated temperature so as to form a diffusion bond joint where the flanges meet.

Other of the above objects are obtained by a metal bond joint for use with hollow articles formed from metal shells. The bond joint includes a pair of opposed flanges and a diffusion bond. The pair of opposed flanges are in contact with one another, and each of the opposed flanges is disposed at the periphery of one of the metal shells. The flanges are aligned with one another and define a bond region where they are in contact with one another. The diffusion bond is formed between the pair of opposed flanges, across the entire bond region.

Still other of the above objects are obtained by a hollow metal article formed of a pair of opposed metal shells and a metal bond joint. The bond joint includes a pair of opposed flanges and a diffusion bond. The pair of opposed flanges are in contact with one another, and each of the opposed flanges is disposed at the periphery of one of the metal shells. The flanges are aligned with one another and define a bond region where they are in contact with one another. The diffusion bond is formed between the pair of opposed flanges, across the entire bond region.

More specifically, bonding of beryllium shells to form a beryllium vessel with an interior void (HIPV) is a process that has four interrelated steps: (1) preparation of beryllium shells (or blanks); (2) tooling fabrication and assembly of tooling with beryllium shells; (3) bonding at high temperature and pressure (i.e., the HIP process); and (4) machining of the vessel exterior. Each of these steps is further defined below. Co-designing of the tooling (in the second step) and the peripheral flange (in the first step) interrelates these two phases of the bonding process. The result is a standardized way of creating bond joints.

BRIEF DESCRIPTION OF THE DRAWINGS

The invention will be appreciated by review of the following detailed description, in conjunction with viewing of the appended drawing figures.

FIG. 1A illustrates a cross-sectional view of an article to be bonded in combination with a tooling assembly according to a preferred embodiment.

FIG. 5 illustrates a partial cross-sectional view of a tooled assembly enclosed in a sealed can and ready for HIP.

DESCRIPTION OF THE PREFERRED EMBODIMENTS

Diffusion bonding is a bonding process by which two work pieces (each formed of the same metal) are joined to one another without using a filler metal and without either of the work pieces melting. Each of the pieces to be bonded has a nominally flat surface. These two flat surfaces are butted up against one another and then a compressive force is applied to the pieces while the temperature is maintained at an elevated temperature that is below the melting point of the metal which the work pieces are made of.

The physical process that occurs at the interface between the two abutted surfaces of the work pieces is a diffusion process. Technically, no melting occurs since there is no wholesale dissociation of the atomic bonds in the bulk of the work pieces. At the surface interface, however, the atomic bonds do shift about substantially so that the two surfaces may integrate together as a homogeneous bulk with no gap. When the temperature is lowered and the compression forces relieved, the atomic lattice is stable and essentially homogeneous.

Typically, though, a number of small voids remain in the bulk as remnants of the surface interface gap that had previously existed. By selection of the appropriate surface texture (neither polished, nor overly rough) the number and size of these small remnant voids is minimized. Such optimized surface preparation know-how is well known in the art.

According to the present invention, special tooling is used to direct the compression force so that hollow beryllium articles can be formed effectively and reliably without crushing the article in the process. This is a very real concern since the hollow article can easily be crushed at the temperature and pressure combination at which diffusion bonding needs to be done. When diffusion bonding can be used successfully, a hollow beryllium article can be formed without a seam of filler metal.

Figure 1:
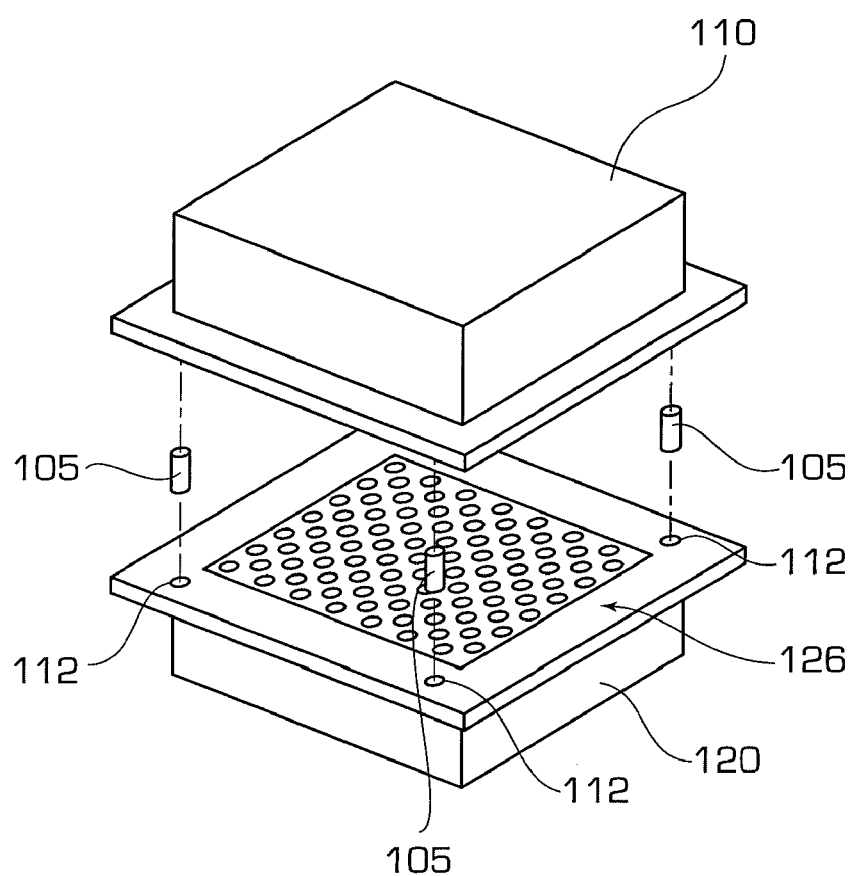
FIG. 1 illustrates an exploded view of two HIP vessel blanks to be assembled together with tooling pins.

Referring to FIG. 1, an exploded view is shown of two HIP vessel blanks 110, 120 to be assembled together with tooling pins 105. A plurality of alignment holes 112 are drilled into the lower blank 120. Likewise, a plurality of alignment holes (not shown) are drilled into the upper blank 110. None of the alignment holes are drilled through their respective blanks. The tooling pins 105 fit into the alignment holes in each of the blanks 110, 120.

An interior cavity 126 is formed in vessel blank 120, and a corresponding interior cavity (not shown) is formed in vessel blank 110. Processes for forming these interior cavities are discussed in detail below.

Referring to FIG. 1A, a cross-sectional view is shown of an article to be bonded in combination with a tooling assembly. The upper vessel blank 110 is mated to the lower vessel blank 120 so that the upper flange 110' and the lower flange 120' meet to form bonding flange 212. A void 160 is formed between the two blanks 110, 120. The upper tooling member 130 bears down on the top of flange 110' and the lower tooling member 140 bears directly on the bottom of flange 120'. No pressure is brought to bear on the walls of the blanks 110, 120 of the article, only the flanges. The large black arrows at the top and bottom of FIG. 1A indicate the directions in which opposing compression forces are to be applied in the HIP process.

The height H of the article formed by the joined blanks 110, 120 may be any size. This method is particularly advantageous for articles where the height H of the article exceeds two inches.

Figure 2:
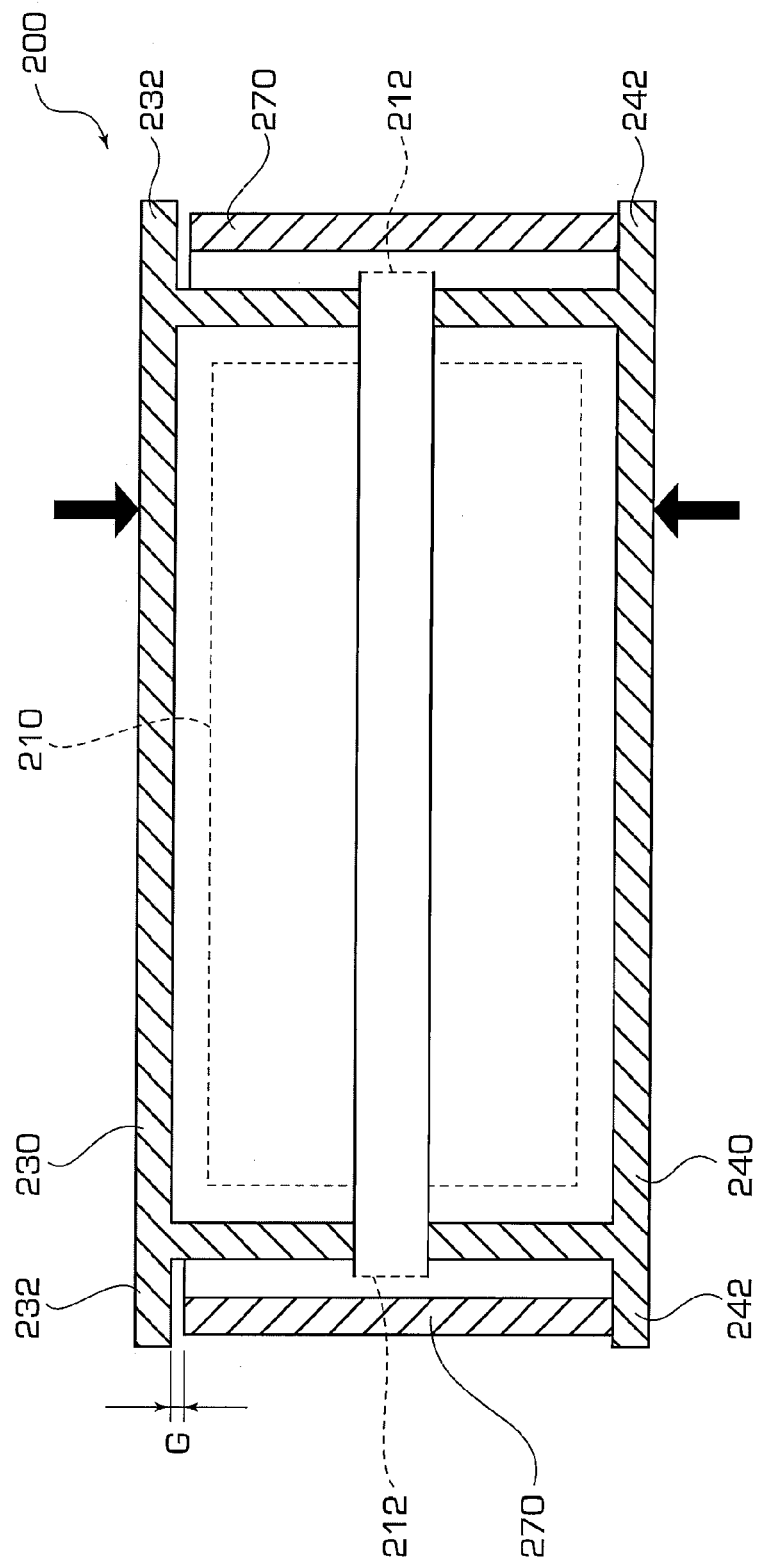
FIG. 2 illustrates a cross-sectional view of a tooling assembly according to an alternate embodiment of the present invention, with an article to be bonded shown in phantom.

Referring to FIG. 2, a cross-sectional view is shown of a tooling assembly according to an alternate embodiment of the present invention, with an article 210 to be bonded shown in phantom. The tooling used in the HIP process controls the direction of compression and limits the amount of compression of the subject parts during bonding. The tooling must be fabricated to have the appropriate physical dimensions for the particular article being worked on. In the example shown in FIG. 2, bonding compression of the article 210 (i.e., blanks 110, 120 assembled according to the exploded view in FIG. 1) is constrained to only one direction. The blanks 110, 120 have respective flanges 110', 120', which when placed together form the bonding flange 212 of the article.

A peripheral retention member 270 around the periphery of the article 210 prevents any compression/bonding from occurring in the horizontal direction. A small gap between the article and the surrounding peripheral retention member 270 is implemented to insure that no contact/bonding occurs in the horizontal direction. The top tooling member 230 and the bottom tooling member 240 each have respective flanges 232, 242. The tooling members 230, 240 are designed to contact the article 210 only on the top and bottom of the bonding flange 212 portion. The top flange 232 on the top tooling member 230 is machined down 408 (see FIG. 4) to regulate the amount of compression upon the bonding flange 212 of the article 210. The compression stops when the top flange 232 of the top tooling member 230 comes in contact with the top of the peripheral retention member 270. A typical compression gap, G, is 0.020–0.040 inches, depending upon the physical dimensions of the bonding flange 212. The large black arrows at the top and bottom of FIG. 2 indicate the directions in which opposing compression forces are to be applied in the HIP process.

Figure 3:
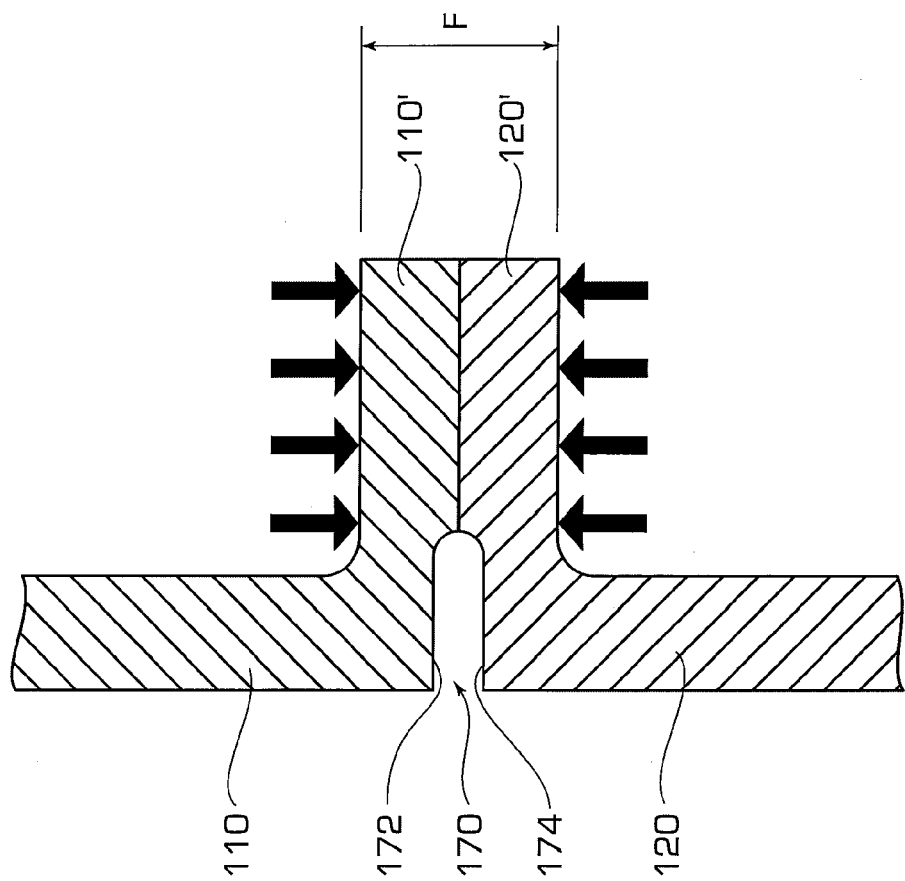
FIG. 3 illustrates a detail view of the bond joint configuration of the article of FIG. 1A.

Referring to FIG. 3, a detail view of the bonding flange of the article of FIG. 1A is shown. The flange 110' of the upper blank 110 and the flange 120' of the lower blank 120, when placed together, form the bonding flange 212 of the article. The thickness F of the bonding flange 212 is the combined thicknesses of the upper flange 110' and lower flange 120'. Although the HIP process may operate effectively where F>2 inches, it is preferred to practice the invention with F<2 inches. The further away the pressure is applied from the bond line the more the energy is dissipated in the body, thereby reducing the actual pressure at the bond line. This is a substantial effect for purposes of determining the actual pressure applied at the bond line. After bonding, the bonding flange 212 will have a thickness F'=F−Δ, where Δ represents the amount of compression of the flange that is permitted during the HIP process.

The interior gap 170 shown in FIG. 3 is not to scale and is, in fact, exaggerated to illustrate that the blanks 110, 120 are shaped so that the bonding is intended to occur at the interface of the flanges 110', 120', in the area where force is applied, not where the walls of the blanks may abut. The large black arrows at the top and bottom of the flanges in FIG. 3 indicate the directions in which opposing compression forces are to be applied, and where (on the flanges) they are to be applied in the HIP process. The interior gap 170 is formed by a pair of opposed depressions 172, 174 that are formed in the blanks before they are assembled together with the tooling pins. The advantage of the interior gap 170 is that it eliminates pseudo cracks adjacent the bond joint.

Without the interior gap 170, the portion of the vessel where the walls abut, interior of the flange may not form a consistent diffusion bond. An incomplete diffusion bonding is a thin fissures that is, in effect a crack, (or pseudo crack). The presence of the pseudo cracks adjacent the bond joint would predispose the joint to be less reliable. That is because large positive internal pressures in the vessel tend to cause a pseudo crack to propagate through the bond joint, just as a fatigue crack would, leading to a structural failure of the vessel. The interior gap 170 avoids this danger by preventing any pseudo cracks from forming. A solid bond joint is formed, directly between areas where force is applied to the bonding flange, from the exterior of the vessel all the way to the interior of the vessel.

Figure 4:
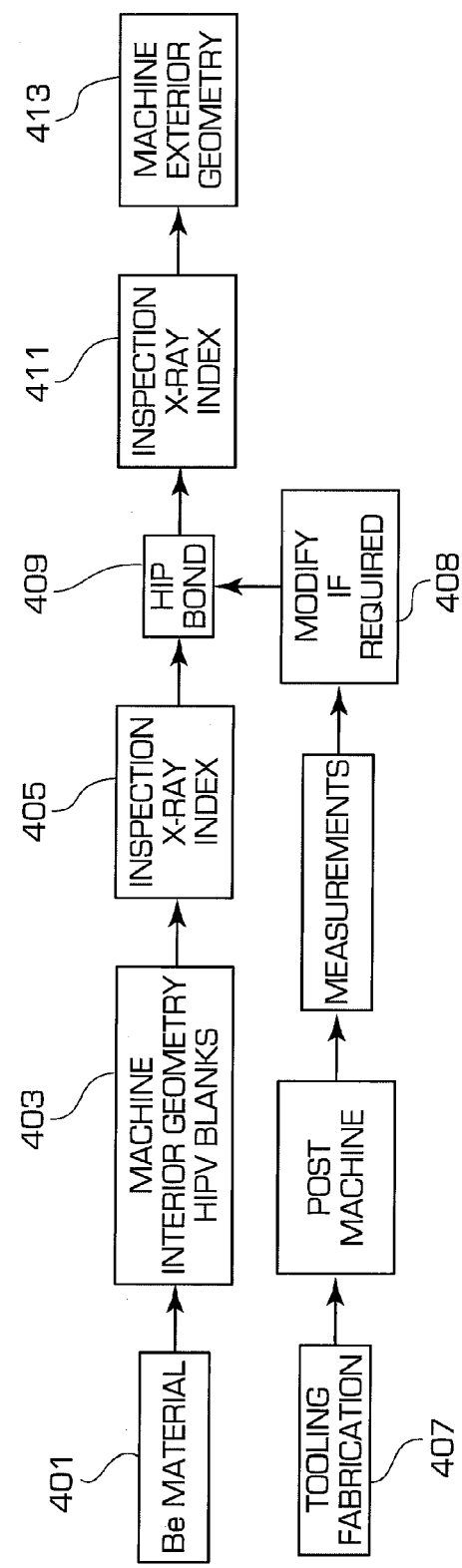
FIG. 4 illustrates a HIP vessel manufacturing process.

The steps illustrated in FIG. 4 summarize the HIP vessel manufacturing process according to a preferred embodiment. The HIP vessel manufacturing process comprises four interrelated steps: (1) preparation of beryllium blanks (or shells); (2) tooling fabrication and assembly of tooling with beryllium blanks; (3) diffusion bonding at high temperature and pressure (i.e., the HIP process); and (4) machining of the vessel exterior. Each of these steps is further described as follows.

Preparation of Beryllium Blanks

A plurality of blanks is fabricated. Each of the blanks has an interior cavity that will yield the required final interior void when the blank is bonded to a mating blank. Starting with Be material 401, the interior cavity geometry is machined 403 into the block. The external bond joint shown in FIG. 3 is also machined around the exterior of both blanks. Optionally, a portion of the exterior shell geometry is machined at this time.

Factors to be considered in dimensioning the interior geometry of the blank include the dimensions of the final article and the amount of compression that will be obtained during the bonding process. The preferred method for precisely machining the void volume is to drill a plurality of holes into the blanks 110, 120 to form an interior cavity 126 into the blank. This is illustrated in the exploded view of FIG. 1. None of the holes are drilled through their respective blanks.

Besides mechanical machining (drilling, milling, etc.), alternate embodiments of the method according to the invention form the internal cavity in the blank by extrusion, by electrical discharge machining (i.e., "EDM"), or by etching. One particular form of etching that may advantageously be used is to form a beryllium "foam" by placing small solid copper spheres in molten beryllium, cooling the beryllium to solid form, and then etching the copper spheres out of the beryllium to leave behind many small spherical voids.

Fabrication and Assembly of Tooling

After the blanks 110, 120 have been fabricated, they are assembled (refer to FIG. 1) with tooling pins 105 to aid in the alignment throughout the HIP process. FIG. 1A illustrates an alternate embodiment wherein at least one pillar 150 is placed in the void 160 formed by the internal cavities of the blanks. Although the pillar 150 is not required for the practice of the HIP method according to the present invention, it is useful for ensuring that the article does not collapse during the HIP process. The tooling is assembled around the article such that the compression from the external pressure will only be applied at the location identified by the arrows in FIG. 3. All other locations will have a small gap to ensure no indirect pressure is induced into the article in the wrong direction.

For beryllium outer shells, the material used for fabricating 407 the tooling (130, 140, 230, 240, 270) must show sufficient strength at 1700° F. to withstand the 2000-psi pressure without deforming, so as to protect the article from inadvertent over-compression. Examples of suitable tooling materials are Inconel 718, IN 100, and molybdenum, due to their ability to maintain strength at high temperatures. Generally, materials that can maintain strength at high temperatures are applicable.

Before the article is completely assembled with the tooling structures, the baseline positions of the exterior and interior features of the article are registered 405. This registration of positions is done using x-rays and scribe indexing.

As a final step of the tooling process, the tooled article is placed in a seal welded (usually steel) can. Refer to FIG. 5. The assembled combination of the article with the tooling (230, 240, 270) is enclosed in a can having a bottom 503 welded 505 to a side 501, which is welded 502 to a top 504.

The HIP Process

After the article/tooling assembly is sealed in a can, the assembly is then placed in a Hot Isostatic Press (HIP) and pressurized 409 at a high temperature. As a working example, a beryllium article is placed in a Hot Isostatic Press and pressurized to over 1900 psi (preferably 2000–2500 psi) at a temperature of over 1650° F. (preferably 1700–1750° F.) for about three hours. These parameters work well for beryllium. These parameters can be varied substantially depending on the particular article and depending on apparatus limitations. When the article is to be formed of a material other than beryllium, the parameters are varied to suit the properties of the chosen material.

Final Machining

After pressing is completed, the article is removed from the HIP canister and the tooling. Non-destructive inspection (NDI) and index identification (via X-Ray imaging) are performed 411 to identify the location of any flaws (such as cracks) and of physical features (such as the interior void). The exterior of the article is then machined 413 using conventional techniques to give it any desired exterior shape (not shown).

HIP vessel bonding according to the method of the present invention is also useful for bonding metals other than beryllium. Examples of other suitable materials for practice of the invention are beryllium/aluminum alloy, titanium, stainless steel, and aluminum.

The bonding method of the present invention is useful for making thermal control devices, propulsion systems, cryogenic coolers, heat exchangers, vacuum systems, and other pressure vessels. Such pressure vessels are useful for scientific detectors and for space flight applications. A heat exchanger made according to the disclosed method is useful for automotive applications as a "radiator" heat exchanger. Typically these systems require weight optimization, high reliability and the ability to withstand large temperature cycling throughout their functional life.

The article to be manufactured may be any shape. The roughly cube shaped article illustrated in the drawings appended hereto is but an arbitrary example of the various shapes in which articles may be formed according to the present invention.

The present invention has been described in terms of preferred embodiments. However, numerous modifications and variations may be made to the invention as described without departing from the scope of the invention.

What is claimed is:

1. A method of bonding metal shells to form a vessel having an interior void, the method comprising:
    forming each of the metal shells with a peripheral flange;
    aligning the metal shells with one another such that their respective peripheral flanges are engaged with one another;
    assembling the aligned metal shells with tooling to engage the flanges; and
    applying compression force directly to the flanges, via the tooling, at an elevated temperature so as to form a diffusion bond joint where the flanges meet;
    wherein the region where the flanges engage one another defines a bond region, and wherein the compression force is applied broadly across the flanges so as to cover at least the bond region.

2. The method of bonding recited in claim 1, wherein the bond joint is formed entirely over the region where the flanges engage one another.

3. The method of bonding recited in claim 1, wherein the metal shells are formed of beryllium or a beryllium alloy.

4. The method of bonding recited in claim 1, wherein the elevated temperature is in the range of about 1700° F. to 1750° F.

5. The method of bonding recited in claim 1, wherein the compression force is in the range of about 2000 psi to 2500 psi.

6. The method of bonding recited in claim 1, wherein the compression force is applied broadly across the flanges so as to cover only the bond region.

7. The method of bonding recited in claim 1, further comprising stopping the compression when a deformation size reaches a predetermined value.

8. The method of bonding recited in claim 7, wherein stopping the compression includes stopping the compression when the deformation size reaches about 0.020 to about 0.040 inches.

9. The method of bonding recited in claim 1, wherein the thickness of the flanges is less than about 2 inches.

10. The method of bonding recited in claim 1, further comprising placing the metal shells and the tooling into a sealed can prior to application of the compression force, wherein applying the compression force comprises pressurizing the can.

11. The method of bonding recited in claim 10, wherein pressurizing the can includes pressurizing over about 1900 psi at an elevated temperature of over about 1650° F.

12. The method of bonding recited in claim 1, wherein applying the compression force to the flanges includes applying the compression force to the flanges without applying the compression force to side walls of the metal shells from which the peripheral flanges extend.

13. A metal bond joint for use with hollow articles formed from metal shells, the bond joint comprising:
    a pair of opposed flanges in contact with one another, each of the opposed flanges being disposed at the periphery of one of the metal shells, the flanges being aligned with one another, defining a bond region where they are in contact with one another, and being shaped such that a gap is formed in an area between the shells within the wall thickness of the shells and at a region where the shells would abut so as to prevent the bond region from extending into the area; and
    a diffusion bond between the pair of opposed flanges, formed across the entire bond region.

14. The metal bond joint recited in claim 13, wherein the bond joint is free of filler metal.

15. The metal bond joint recited in claim 13, wherein the metal of the bond joint is homogeneous.

16. The metal bond joint recited in claim 13, wherein the bond joint is formed of beryllium or a beryllium alloy.

17. The metal bond joint recited in claim 13, wherein the diffusion bond is formed by applying compression force to the flanges at an elevated temperature.

18. The metal bond joint recited in claim 17, wherein the elevated temperature is in the range of about 1700° F. to 1750° F.

19. The metal bond joint recited in claim 17, wherein the compression force is in the range of about 2000 psi to 2500 psi.

20. A hollow metal article comprising:
    a pair of opposed metal shells; and
    a metal bond joint, the bond joint comprising:
        a pair of opposed flanges in contact with one another, each of the opposed flanges being disposed at the periphery of one of the metal shells, the flanges being aligned with one another, defining a bond region where they are in contact with one another, and being shaped such that a gap is formed in an area between the shells within the wall thickness of the shells and at a region where the shells would abut so as to prevent the bond region from extending into the area; and
        a diffusion bond between the pair of opposed flanges, formed across the entire bond region.

21. The hollow metal article recited in claim 20, wherein the bond joint is free of filler metal.

22. The hollow metal article recited in claim 20, wherein the metal of the bond joint is homogenous.

23. The hollow metal article recited in claim 20, wherein the bond joint is formed of beryllium or a beryllium alloy.

24. The hollow metal article recited in claim 20, wherein the diffusion bond is formed by applying compression force to the flanges at an elevated temperature.

25. A homogenous bond joint for use with hollow beryllium articles formed from beryllium shells, the bond joint comprising:
    a pair of opposed beryllium flanges in contact with one another, each of the opposed flanges being disposed at the periphery of one of the beryllium shells, the flanges being aligned with one another and defining a bond region where they are in contact with one another; and
    a diffusion bond between the pair of opposed flanges, formed across the entire bond region;
    wherein the flanges are shaped such that a gap is formed in an area between the shells within the wall thickness of the shells and at a region where the shells would abut so as to prevent the bond region from extending into the area;
    wherein the diffusion bond is formed by applying compression force to the flanges at an elevated temperature.

* * * * *